(12) United States Patent
Akinbode et al.

(10) Patent No.: US 11,283,264 B2
(45) Date of Patent: Mar. 22, 2022

(54) SHORT-TERM RESERVE PRODUCT FOR IMPLEMENTATION ON AN ELECTRIC POWER GRID, AND ASSOCIATED METHOD

(71) Applicant: Midcontinent Independent System Operator, Inc., Carmel, IN (US)

(72) Inventors: Oluwaseyi W. Akinbode, Carmel, IN (US); Akshay S. Korad, Carmel, IN (US); Gary Waldo Rosenwald, Bellevue, WA (US); Yonghong Chen, Zionsville, IN (US); Kevin Vannoy, Carmel, IN (US); Fengyu Wang, Carmel, IN (US)

(73) Assignee: Midcontinent Independent System Operator, Inc., Carmel, IN (US)

(*) Notice: Subject to any disclaimer, the term of this patent is extended or adjusted under 35 U.S.C. 154(b) by 15 days.

(21) Appl. No.: 16/738,491

(22) Filed: Jan. 9, 2020

(65) Prior Publication Data
US 2020/0220359 A1 Jul. 9, 2020

Related U.S. Application Data

(60) Provisional application No. 62/790,238, filed on Jan. 9, 2019.

(51) Int. Cl.
*H02J 3/38* (2006.01)
*G05B 15/02* (2006.01)
(Continued)

(52) U.S. Cl.
CPC .............. *H02J 3/381* (2013.01); *G05B 15/02* (2013.01); *G06Q 10/06315* (2013.01);
(Continued)

(58) Field of Classification Search
CPC .... H02J 3/381; H02J 2203/20; H02J 2300/20; H02J 3/004; H02J 2203/10; H02J 3/144;
(Continued)

(56) References Cited

U.S. PATENT DOCUMENTS 8,855,279 B2* 10/2014 Forbes, Jr. ............... H04B 3/54
379/106.03
10,509,374 B2* 12/2019 Parvania .................. G05F 1/66
(Continued)

FOREIGN PATENT DOCUMENTS

WO WO 2012/106431 A1 8/2012
WO WO 2013/063581 A1 5/2013

OTHER PUBLICATIONS

"Business Practices Manuals"; https://www.misoenergy.org/legal/business-practice-manuals; Midcontinent Independent System Operator, Inc.; © 2010-2020; accessed Feb. 18, 2020; 3 pages.
(Continued)

*Primary Examiner* — Ramesh B Patel
(74) *Attorney, Agent, or Firm* — BakerHostetler

(57) ABSTRACT

A method for operating an electrical power grid, which includes an electrical power grid, a plurality of power generation participants providing electrical power to the electrical power grid, a plurality of consumers drawing electrical power from the electrical power grid, and a controller that administers the market for the power generation participants and the consumers on the electrical power grid. The method may include providing, by the controller, a short-term reserve (STR) product for the consumers. The STR may be provided by the power generation participants through online resources and offline resources. And the controller may share a ramp capability product (RCP) capacity and a resource capacity.

17 Claims, 1 Drawing Sheet

(51) Int. Cl.
*G06Q 10/06* (2012.01)
*G06Q 50/06* (2012.01)
*H02J 3/00* (2006.01)

(52) U.S. Cl.
CPC .............. *G06Q 50/06* (2013.01); *H02J 3/004* (2020.01); *H02J 2203/20* (2020.01); *H02J 2300/20* (2020.01)

(58) Field of Classification Search
CPC .. G05B 15/02; G06Q 10/06315; G06Q 50/06; Y02B 70/3225; Y04S 40/20; Y04S 20/222; Y02E 60/00
See application file for complete search history.

(56) References Cited

U.S. PATENT DOCUMENTS

| | | | | |
|---|---|---|---|---|
| 2010/0332373 | A1* | 12/2010 | Crabtree | G06Q 40/04 705/37 |
| 2014/0018969 | A1* | 1/2014 | Forbes, Jr. | H02J 3/32 700/295 |
| 2014/0336840 | A1* | 11/2014 | Geinzer | G05B 11/00 700/297 |
| 2015/0184550 | A1* | 7/2015 | Wichmann | F01K 13/02 700/287 |
| 2015/0278968 | A1* | 10/2015 | Steven | G06Q 10/06314 705/7.35 |
| 2016/0098794 | A1* | 4/2016 | Mokhtari | G06Q 40/04 705/37 |
| 2017/0358041 | A1* | 12/2017 | Forbes, Jr. | G06Q 10/00 |
| 2018/0366978 | A1* | 12/2018 | Matan | G05B 19/042 |
| 2019/0139159 | A1* | 5/2019 | Sarker | G06Q 30/08 |
| 2020/0176986 | A1* | 6/2020 | Addepalle | H02J 3/28 |
| 2020/0258168 | A1* | 8/2020 | Ye | G06Q 30/0202 |

OTHER PUBLICATIONS

"Development Additional Short-term Capacity Reserve Requirements"; Market Roadmap ID: 10; Issue ID: MR010; Apr. 2016; MISO; 9 pages.
"Short-Term Capacity Reserves"; Market Roadmap ID: MR010; Dec. 2017; MISO; 13 pages.
"Short Term Capacity Reserve—Evaluation"; Mar. 2018; MISO; 35 pages.
Akinbode et al.; "Short Term Capacity Reserves"; Jun. 2018; MISO; 16 pages.
"Short-Term Reserve"; Market Roadmap ID: 10; Issue ID: MR010; Sep. 2018; MISO; 18 pages.
"Short-Term Reserve—Conceptual Design"; Oct. 2018; MISO; 20 pages.
"Short Term Reserve (STR)"; Market Roadmap ID: 10; Issue ID: MR010; Nov. 2018; MISO; 19 pages.
RTO Insider—Your Eyes and Ears on the Organized Electric Markets; vol. 2017; Dec. 2017; 50 pages.
Madrigal et al., "Operating and Planning Electricity Grids with Variable Renewable Generation"; A World Bank Study; The World Bank; © 2013; 125 pages.
Pierpont et al.; "Flexibility—The path to low-carbon, low-cost electricity grids"; Climate Policy Initiative; A CPI Report; Energy Transitions Commission; Apr. 2017; 74 pages.
The Power of Transformation—Wind, Sun and the Economics of Flexible Power Systems; Int'l Energy Agency; © 2014; 238 pages.
Energy Systems Toolkit—Electricity Markets Module; HIE Highlands and Islands Enterprise; 2017; 13 pages.
Ma et al.; "Midwest ISO Co-Optimization Based Real-Time Dispatch and Pricing of Energy and Ancillary Services"; IEEE; 2009; 6 pages.
2016 State of the Market Report for the MISO Electricity Market; Analytic Appendix; Jun. 2017; 160 pages.
Review of Ancillary Service Requirements, Process and Standards—Invitation to Provide Submissions on Draft Report; Apr. 2009; Independent Market Operator; 101 pages.

* cited by examiner

SHORT-TERM RESERVE PRODUCT FOR IMPLEMENTATION ON AN ELECTRIC POWER GRID, AND ASSOCIATED METHOD

CROSS-REFERENCE TO RELATED APPLICATIONS

This application claims the benefit of the priority date of U.S. provisional application 62/790,238 filed on Jan. 9, 2019 and entitled "Short-Term Reserve Product for Implementation on an Electric Power Grid, and Associated Method," the content of which is incorporated by reference herein in its entirety.

TECHNICAL FIELD

The present disclosure relates generally to systems and methods for improving market efficiency, transparency, and reliability.

BACKGROUND

A Short-Term Reserve (STR) is in immediate need to improve upon the out-of-market commitments currently used to pre-position certain local areas and an independent system operator's (ISO's) region for STR needs. Additionally, there is a need to explicitly address market-wide STR needs within the market framework that may arise due to factors, such as the changing resource mix and fuel prices. A controller's STR needs may be regional or sub-regional, load pocket, or market-wide.

SUMMARY

Systems and methods are disclosed for operating an electrical power grid. The electrical power grid may include an electrical power grid, a plurality of power generation participants providing electrical power to the electrical power grid, a plurality of consumers drawing electrical power from the electrical power grid, and a controller that administers the market for the power generation participants and the consumers on the electrical power grid. The method may include providing, by the controller, an STR product for the consumers, wherein the STR may be provided by the power generation participants through online resources and offline resources, and wherein the controller shares a ramp capability product (RCP) capacity and a resource capacity.

The method is implemented by a system comprising one or more hardware processors configured by machine-readable instructions and/or other components. The system comprises the one or more processors and other components or media, e.g., upon which machine-readable instructions may be executed. Implementations of any of the described techniques and architectures may include a method or process, an apparatus, a device, a machine, a system, or instructions stored on computer-readable storage device(s).

BRIEF DESCRIPTION OF THE DRAWINGS

The details of particular implementations are set forth in the accompanying drawings and description below. Like reference numerals may refer to like elements throughout the specification. Other features will be apparent from the following description, including the drawings and claims. The drawings, though, are for the purposes of illustration and description only and are not intended as a definition of the limits of the disclosure.

DETAILED DESCRIPTION

As used throughout this application, the word "may" is used in a permissive sense (i.e., meaning having the potential to), rather than the mandatory sense (i.e., meaning must). The words "include," "including," and "includes" and the like mean including, but not limited to. As used herein, the singular form of "a," "an," and "the" include plural references unless the context clearly dictates otherwise. As employed herein, the term "number" shall mean one or an integer greater than one (i.e., a plurality).

As used herein, the statement that two or more parts or components are "coupled" shall mean that the parts are joined or operate together either directly or indirectly, i.e., through one or more intermediate parts or components, so long as a link occurs. As used herein, "directly coupled" means that two elements are directly in contact with each other.

Unless specifically stated otherwise, as apparent from the discussion, it is appreciated that throughout this specification discussions utilizing terms such as "processing," "computing," "calculating," "determining," or the like refer to actions or processes of a specific apparatus, such as a special purpose computer or a similar special purpose electronic processing/computing device.

Figure 2:
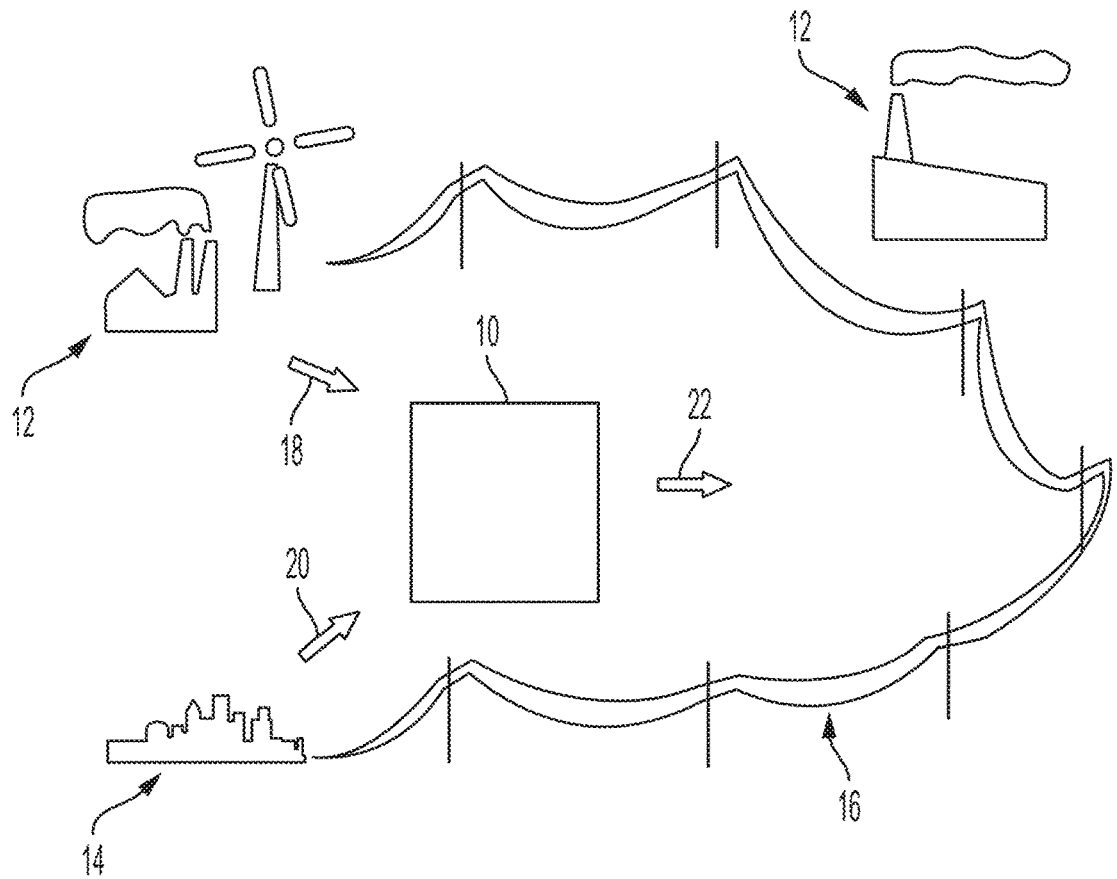
FIG. 2 illustrates an example of a system in which an STR product is implemented on a power grid, in accordance with one or more embodiments.

FIG. 2 illustrates a system configured to implement, by a controller that administers the market for electricity producers and users on an electric power grid, an STR product. The STR product may be intended to align the controller's markets with specific reliability obligations and STR needs. Not all operational needs may be addressed through electricity markets. If certain reliability needs are not included in the market clearing models, operators have to use out of market approaches to address (e.g., manual commitment of generators). The out of market approaches are usually inefficient.

One or more examples of reliability obligations may include, e.g., maintaining transmission flows with limits and maintaining a voltage within certain ranges. If the transmission connecting outside to a load center is not strong enough, it will not be able to import power from outside to meet a load in the pocket after an event such as loss of a generator in the pocket. Clearing STR in the pocket works as an insurance to have enough capacity that may move up in short term to balance the load in the pocket and restore the transmission constraint flow below limits.

The disclosed STR product may: increase efficiency in the controller's commitment processes related to reserve zone, sub-regional, load pocket, regional directional transfer (RDT), and/or market-wide STR needs; improve transparency of the costs associated with satisfying STR needs through STR product prices; enhance reliability by aligning operational needs and market models to ensure the market dispatch provides the required STR response in the needed locations; and better position the controller to withstand transitions in a resource mix that may potentially increase the need for, and erode the availability of flexible resources. For example, when there is sudden change due to wind availability and cloud, the grid may need flexible resource to quickly pick up the imbalance.

By including the product in the market clearing process instead of out of market manual actions, it may optimize the resources allocated for meeting current energy and being prepared for future contingencies. Hence, efficiency may be increased in the commitment. A resource mix may include renewable penetration (e.g., wind, solar, etc.). The outputs from these resources may be uncertainty and volatility. It may increase the need for flexibility. The market clearing price may reflect the cost for procuring STR, hence improving transparency of costs. The issue may become more problematic with future renewable penetration due to increased uncertainty.

Disclosed is a conceptual design for the STR product, which will allow the controller to procure flexible capacity and convert it to energy within the STR response period of 30 minutes. The STR product design leverages features from existing reserve products but may be a separately cleared product serving local, sub-regional, and market-wide needs serving regional, load pocket, and market-wide needs. Flow-based transmission constraints may be used to dynamically determine and reserve required flexibility in a region or load pocket, while offline analyses determine a market-wide requirement used to reserve flexible market-wide capacity anywhere in the footprint. This footprint may be the market as a whole. STR may work as an insurance. For example, when things do not match what is predicted (e.g., sudden loss of a large generator in the pocket), cleared STR may be used to clear energy (i.e., convert to energy to meet load balance).

The STR product may be considered along with other energy and ancillary service requirements in the controller's market clearing processes including commitment, dispatch, and pricing. Using the STR product, the controller may more efficiently procure capacity for STR needs and improve reliability. Additionally, STR market clearing prices (MCPs) determined by opportunity costs, offer prices, demand curves, and/or penalty prices—when there is insufficient STR cleared to meet STR needs—may allow the controller to more transparently reflect the costs of reliability requirements and STR needs in market prices. Resources providing STR may be compensated based on STR MCPs and the associated costs may be allocated using a STR binding zone allocation approach, similar to the existing approach used for Contingency Reserves (CR). An STR binding zone may be based on critical transmission congestion paths.

Some key feature differences between STR and another ISO's energy and ancillary service (AS) products (e.g., CR and RCP) may include: a delivery timeframe for STR being 30 min., whereas a CR may be 10 min. and an RCP may be 20 min.; an STR may be supplied by online as well as an offline fast start resource; at this point, no additional offers may be needed for online resources but offline resources may be required to have STR offer for participation; a comparison with CR, as per reliability standards and tariff, CR may only be deployed in response to contingencies, but STR may be used 1) in response to contingencies, 2) for managing regional directional transfer (RDT) constraint, 3) for local or regional capacity needs (which may be many time managed outside of market), and/or 4) for managing high levels of uncertainties (from supply as well as demand side); RCP may be supplied by online resource only but STR may be supplied by online as well as offline fast start resource; in CR and RCP, a resource ramp may be shared but resource capacity may not be shared between energy and AS products (which means at a high level that cleared energy plus CR plus RCP may be less than a resource maximum MW (EcoMax)) and, in STR, a resource ramp as well as a resource capacity may be shared (which means cleared energy plus CR plus RCP plus STR may be more than EcoMax); like RCP, STR requirements may be determined dynamically and online resources may be deployed within market cycles, ISO operations having commitment control over offline STR cleared resources; conceptually all AS products may not be designed with an inherent deliverability test to ensure proper deliverability of cleared products (over time have enhanced market design to include deliverability test such as reserve procurement enhancement (RPE), these enhancements being now useable). An STR product may be designed with inherent deliverability test to 1) ensure appropriate deployment and 2) appropriately price the product considering deliverability limitations. An STR deliverability test may not be exactly the same as RPE due to difference in deployment time and resource pool.

This disclosure describes an STR product including detailing the design approach for registration and STR offers; market clearing; STR deployment, pricing, and measurement; and settlement. The disclosure also discusses the limitation of the STR product in regard to addressing local voltage issues.

After a large event, an STR may be converted to local/regional energy dispatch and hence, to ensure RDT constraint to go back to limit within 30 min. It may help manage a high level of uncertainty by holding the STR capacity in preparation of the uncertainty event. Some embodiments may manage high levels of uncertainties from a supply side as well as from a demand side. The term capacity herein implies a rated capacity, nominal capacity, installed capacity, or maximum effect, e.g., being an intended full-load sustained output of a facility such as a power plant, electric generator, chemical plant, fuel or thermal plant, metal refinery, mine, and/or another power source.

Ensuing are definitions of parameters and other variables. $\text{Energy}_{r,t}$ may be defined as an amount of energy cleared on resource r for time t. $\text{FlowSystemEnergy}_{k,t}$ may be defined as a flow over constraint k at time t associated with the energy dispatch at time t. $\text{Headroom}_{r,t}$ may be defined as a headroom cleared on resource r at time t. HeadroomRegFactor may be defined as a configurable Boolean parameter that determines whether cleared regulating reserve is considered in the resource capacity constraint for headroom. HeadroomSTRFactor may be defined as a configurable Boolean parameter that determines whether cleared STR is considered in the resource capacity constraint for headroom. $\kappa_{r,t}$ may be defined as Binary commitment variable for resource r at time t. kScope may be defined as a set of zones, which provide STR response for STR transmission constraint k. For example, the sub-regional RDT constraint scope includes all zones in the South Region. $\text{MaxOfflineSTR}_{r,t}$ may be defined as a maximum offline STR response of resource r at time t within the STR response time t. $\text{Pmax}_{r,t}$ may be defined as an economic maximum limit for resource r for time t. $\text{Pmin}_{r,t}$ may be defined as an economic minimum limit for resource r for time t. $\text{Pregmax}_{r,t}$ may be defined as a regulation maximum limit for resource r for time t. $\rho_{r,t}$ may be defined as a binary regulation commitment variable for resource r at time t. $R_Z$ may be defined as a set of all STR qualified resources in zone z. $R_Z^{ON}$ may be defined as a set of STR qualified online resources in zone z. $R_Z^{OFF}$ may be defined as a set of STR qualified offline resources in zone z. $\text{Ramp}_{r,t}^{STR}$ may be defined as an applicable STR ramp rate for resource r at time t. $\text{Reg}_{r,t}$ may be defined as an amount of regulating reserve cleared on resource r for time t. $\text{STR}_{DC_{step,t}}$ may be defined as market-wide STR cleared for the price at the demand curve step at time t. $STR_{DCmax_{step,t}}$ may be defined as a MW width of the demand curve step which may be the maximum market-wide STR cleared at the associated demand curve step price at time t. $STR_{r,t}^{offline}$ may be defined as a cleared offline STR on resource r at time t. $STR_{r,t}^{online}$ may be defined as a cleared online STR on resource r at time t. TRDeployTime may be defined as an STR deployment time. $STRNeedSens_{k,t}$ may be defined as a constraint flow sensitivity of the STR need for STR transmission constraint k for time t. $STRLimit_{k,t}$ may be defined as an STR transmission constraint maximum flow allowed after STR response for constraint k for time t. $STROffer_{r,t}^{online}$ may be defined as an offline STR offer for resource r for time t. $STRPartic_{r,t}^{offline}$ may be defined as a binary indication whether the resource r may be participating in offline STR for time t. $STRPartic_{r,t}^{online}$ may be defined as a binary indication whether the resource r may be participating in online STR for time t. $STRPrice_{DC_{step,t}}$ may be defined as a demand curve price at the step for time t. STRRampMult may be defined as an STR ramp multiplier, a tuning parameter that determines the percentage of cleared STR that should be deployable within the STR response period. $STRResponse_{k,z,t}$ may be defined as an STR response provided by resources for constraint k in zone z at time t. $t_{1st\ overlap}$ may be defined as an earliest interval which may be fully or partially within the STR response period of the beginning of interval t. $TargetDemRedLevel_{r,t}$ may be defined as a DRR-type I targeted demand reduction level for resource r at time t. $TransLimitSTRPenPrice_{step}$ may be defined as an STR transmission constraint violation penalty price for a step for the price curve. $TransLimitViolSTR_{k,t}$ may be defined as an STR transmission constraint k violation for resource r at time t. $TransLimitViolSTR_{max_{step}}$ may be defined as a MW width of the STR transmission constraint violation penalty curve step which may be the maximum violation amount allowed for the penalty curve step price. $TransLimitViolSTR_{k,step,t}$ may be defined as an STR transmission limit violation for constraint k at the demand curve step at time t. $ZminSTR_{z,t}$ may be defined as a minimum zonal requirement for STR in zone z for time t, with the lower-case z being an index for zone and with ZminSTR representing the minimum STR cleared in a zone. $ZNeedSTR_{k,t}$ may be defined as the need for STR from the zones in scope for STR transmission constraint k for time t. $ZSTRSens_{k,z,t}$ may be defined as a zonal STR response sensitivity for zone z to constraint k at time t, calculated as a weighted average of the constraint flow sensitivities of resources in the zone that may be qualified to provide STR, weighted by the up ramp rate of each resource.

Referring to FIG. 2, an exemplary controller 10, according to the current disclosure, administers the market for electricity producers 12 and users 14 on an electric power grid 16. Some exemplary functions of the controller 10 include monitoring energy transfers on the transmission system, scheduling transmission service, managing power congestion, operating DA and RT energy and operating reserves (OR) markets, and regional transmission planning. Certain of the electricity producers 12 may be able to offer combined cycle configurations, which may utilize a combination of physical power producing units such as one or more combustion turbines (CT), steam turbines (ST), DBs, combined cycle, pump storage, batteries, nuclear, hydro (pumped), wind, utility or rooftop photovoltaic (PV), and the like. In some embodiments, data relating to the electrical power grid may be obtained 18, 20 from electricity producers 12 and users 14 and transmitted 22 to the same. Controller 10 of FIG. 2 may comprise electronic storage. Electronic storage of the system may comprise media that electronically stores information. The electronic storage media may comprise system storage that may be provided integrally (i.e., substantially non-removable) with the system and/or removable storage that may be removably connectable to the system via, for example, a port (e.g., a USB port, a firewire port, etc.) or a drive (e.g., a disk drive, etc.). The electronic storage may be (in whole or in part) a separate component within the system, or the electronic storage may be provided (in whole or in part) integrally with one or more other components of the system (e.g., a user interface device, the processor, etc.). In some embodiments, the electronic storage may be located in a server together with the processor, in a server that may be part of the external resources, in the user interface devices, and/or in other locations. The electronic storage may comprise a memory controller and one or more of optically readable storage media (e.g., optical disks, etc.), magnetically readable storage media (e.g., magnetic tape, magnetic hard drive, floppy drive, etc.), electrical charge-based storage media (e.g., EPROM, RAM, etc.), solid-state storage media (e.g., flash drive, etc.), and/or other electronically readable storage media. The electronic storage may store software algorithms, information obtained and/or determined by the processor, information received via the user interface devices and/or other external computing systems, information received from the external resources, and/or other information that enables the system to function, as described herein.

Controller 10 may further comprise external resources. External resources of the system may include sources of information (e.g., databases, websites, etc.), external entities participating with the system, one or more servers outside of the system, a network, the electronic storage, equipment related to Wi-Fi technology, equipment related to Bluetooth® technology, data entry devices, a power supply, a transmit/receive element (e.g., an antenna configured to transmit and/or receive wireless signals), a network interface controller (NIC), a display controller, a graphics processing unit (GPU), and/or other resources. In some implementations, some or all of the functionality attributed herein to the external resources may be provided by other components or resources included in the system. The processor, the external resources, the user interface device, the electronic storage, a network, and/or other components of the system may be configured to communicate with each other via wired and/or wireless connections, such as a network (e.g., a local area network (LAN), the Internet, a wide area network (WAN), a radio access network (RAN), a public switched telephone network (PSTN)), cellular technology (e.g., GSM, UMTS, LTE, 5G, etc.), Wi-Fi technology, another wireless communications link (e.g., radio frequency (RF), microwave, infrared (IR), ultraviolet (UV), visible light, cm wave, mm wave, etc.), a base station, and/or other resources.

Controller 10 may further comprise user interface device(s). The user interface device(s) of the system may be configured to provide an interface between one or more users and the system. The user interface devices may be configured to provide information to and/or receive information from the one or more users. The user interface devices include a user interface and/or other components. The user interface may be and/or include a graphical user interface configured to present views and/or fields configured to receive entry and/or selection with respect to particular functionality of the system, and/or provide and/or receive other information. In some embodiments, the user interface of the user interface devices may include a plurality of separate interfaces associated with the processors and/or other components of the system. Examples of interface devices suitable for inclusion in the user interface device include a touch screen, a keypad, touch sensitive and/or physical buttons, switches, a keyboard, knobs, levers, a display, speakers, a microphone, an indicator light, an audible alarm, a printer, and/or other interface devices. The present disclosure also contemplates that the user interface devices include a removable storage interface. In this example, information may be loaded into the user interface devices from removable storage (e.g., a smart card, a flash drive, a removable disk) that enables users to customize the implementation of the user interface devices.

In some embodiments, the user interface devices may be configured to provide a user interface, processing capabilities, databases, and/or electronic storage to the system. As such, the user interface devices may include the processors, the electronic storage, the external resources, and/or other components of the system. In some embodiments, the user interface devices may be connected to a network (e.g., the Internet). In some embodiments, the user interface devices do not include the processor, the electronic storage, the external resources, and/or other components of the system, but instead communicate with these components via dedicated lines, a bus, a switch, network, or other communication means. The communication may be wireless or wired. In some embodiments, the user interface devices may be laptops, desktop computers, smartphones, tablet computers, and/or other user interface devices.

Data and content may be exchanged between the various components of the system through a communication interface and communication paths using any one of a number of communications protocols corresponding to the different media delivery platforms. In one example, data may be exchanged employing a protocol used for communicating data across a packet-switched internetwork using, for example, the Internet Protocol Suite, also referred to as TCP/IP. The data and content may be delivered using datagrams (or packets) from the source host to the destination host solely based on their addresses. For this purpose the Internet Protocol (IP) defines addressing methods and structures for datagram encapsulation. Of course other protocols also may be used. Examples of an Internet protocol include Internet Protocol Version 4 (IPv4) and Internet Protocol Version 6 (IPv6).

Controller 10 may further comprise a processor. In some embodiments, the processor may belong to a user device, a consumer electronics device, a mobile phone, a smartphone, a personal data assistant, a digital tablet/pad computer, a wearable device (e.g., watch), a personal computer, a laptop computer, a notebook computer, a work station, a server, a high performance computer (HPC), a vehicle computer, a game or entertainment system, a set-top-box or any other device. As such, the processor is configured to provide information processing capabilities in the system. The processor may comprise one or more of a digital processor, an analog processor, a digital circuit designed to process information, an analog circuit designed to process information, a state machine, and/or other mechanisms for electronically processing information. Although the processor may be a single entity, this is for illustrative purposes only. In some embodiments, the processor may comprise a plurality of processing units. These processing units may be physically located within the same device (e.g., a server), or the processor may represent processing functionality of a plurality of devices operating in coordination (e.g., one or more servers, the user interface devices, devices that may be part of the external resources, the electronic storage, and/or other devices).

In a market, when the quantity supplied (offered) has been matched to the quantity demanded (bid), the amount to be bought and sold has been determined, and settlement between buyers and sellers may be possible. This may be a definition of being cleared.

To meet known needs, the current disclosure provides an STR product that may: increase efficiency in the controller's commitment process related to load pocket, RDT, local, sub-regional, and market-wide reliability needs; improve transparency of the costs associated with satisfying STR needs through STR product prices; enhance reliability by aligning operational needs and market models to ensure that market dispatch provides the required STR response in the needed locations; and better position the controller to withstand transitions in resource mix that may potentially increase the need for and erode the availability of flexible resources.

The STR product may address three components of the controller's STR needs: (i) regional or sub-regional, which may be primarily focused on the controller's RDT obligation that limits energy transfers between geographical regions, and the controller must ensure sufficient flexibility is available to manage inter-regional dispatch flows within RDT limits within 30 minutes following a system event, one or more examples of these events including a loss of large generators or transmission lines; (ii) load pocket, which may be driven by import limitations and lack of flexible resources in certain local areas, the controller currently augmenting its normal practices to secure these local areas or load pockets for the loss of two system elements, and examples of these system elements may include loss of the largest generator in the pocket and one transmission line into the pocket, these additional out-of-market actions ensuring availability of sufficient flexibility to avoid load shed or prevent extended overloads of transmission facilities following a contingency; (iii) market-wide, which may be driven by the need for resource flexibility to manage variability, unplanned deviations, and to replenish deployed reserves. This need may be currently addressed by the residual flexibility resulting as a by-product of current system economics. Future system changes may decrease the available flexibility and/or increase the need for flexibility such that explicit management may be required.

Load pocket or local requirements may be assumed to be associated with reserve zones as defined and established under the Tariff. A load pocket may be an area of the system where the transmission capability may not be adequate to import capacity from other parts of the system and demand may be met by relying on local generation.

Disclosed embodiments may provide STR solutions. STR may be provided by online resources and offline resources that may come online and produce energy within the STR response period. The STR response period may be 30 minutes. Resources may signify interest in participation during registration and/or in the day-ahead and real-time markets through their hourly offers. An offline resource may be a fast start resource.

The controller day-ahead and real-time markets may co-optimize clearing of all products, including STR, for all resources in the market clearing processes, including commitment, dispatch, and pricing. Resources supplying online STR may be cleared in consideration of the opportunity cost of (i) using available resource capabilities for other products or (ii) for providing the STR product. Resources participating with offline STR may be cleared based on their STR offer price. The controller market clearing process may establish STR market clearing prices (MCPs). Under normal operating conditions, this MCP may be indicative of the marginal cost of supplying the required STR as determined by online STR opportunity cost or offline STR offer price. When there is insufficient STR cleared to meet STR needs, demand curves and penalty prices associated with the unmet STR requirement may also impact the STR MCP reflecting STR scarcity. One or more examples of such determinations may include a result of the market clearing optimization. For example, if only a cheap generator can supply STR, an ISO may use a more expensive generator to meet current energy need and dispatch the cheap generator down for it to clear STR.

Resources that clear STR may be paid their respective zonal MCPs. The costs of these STR payments may be allocated by Asset Owner load ratio share using STR Binding Settlement Zones similar to the cost allocation for other types of reserves, for example, Regulating Reserves under Schedule 3. Market participant loads within a STR Binding Settlement Zone may be charged a pro-rata share of the total payments for Resources providing STR within the STR Binding Settlement Zone.

As with other products in the controller's markets, resource ramp rate may be shared between STR and other products such that the full ramp rate may be available by each product individually. In contrast to other products, contingency reserve (CR) capacity and ramp capability product (RCP) capacity may be allowed to overlap with cleared STR, since the STR response period may be beyond the typical CR and RCP 10-minute response times. Two capacities may overlap through a mathematic formulation that the same capacity can be accounted toward CR, RCP and STR. For example, a load can be supplied energy from four different types of power plants at a same time such that an aggregate power supplied breaches an economic maximum (EcoMax) value. Any other type of power plant (e.g., an AS product) other than resource capacity may supply cleared energy. EcoMax may be the highest unrestricted level of electric energy (MW) a resource may be able to generate, representing the highest megawatt output available from the resource for economic dispatch.

Online STR may be deployed as energy, and offline STR may be deployed through commitment instructions. An example of these instructions may include operators sending a startup instruction to a generator. Deployment of online STR capacity may be determined by the controller Unit Dispatch System (UDS) rather than through operator intervention. Although the initial STR response may be delayed for several minutes by the required approval of a new UDS case, the approach allows UDS to economically dispatch and price (e.g., in the LMP) the needed amount of energy responding to system conditions. Deployment of offline STR capacity may require operators to instruct the commitment of those selected resources for STR needs. After start-up, offline STR resources may become available to the UDS and may be dispatched similar to online STR resources. A UDS may be the real time 5-min. dispatch process to determine the optimal energy dispatch MW for all online resource and reserves for all available reserve resources.

Disclosed are some STR requirements. For example, STR may be a separately cleared product serving needs that may be specified at the market-wide, regional, load pockets sub-regional, and/or local levels. STR requirements may not be relaxed following an event or deployment.

Market-wide requirements specify flexible capacity needed to maintain reliable system operations in response to market-wide STR needs. Similar to CR, the market-wide STR requirement may be based on offline analysis and provided to the market clearing functions with a compatible demand curve. The market clearing function may clear STR considering online STR opportunity costs, offline STR offer prices, and when insufficient STR may be cleared to meet STR needs, the demand curve. Furthermore, all cleared STR in the energy and operating reserve market may be deployable within the STR deployment period. The market-wide STR Requirement may be cleared in an economic manner. The market-wide STR Requirement may be cleared in an economic manner and, if required by overall market-wide conditions, may vary within a market hour if permitted by overall market-wide conditions. All market-wide STR cleared in the energy and operating reserve market may be supplied by STR qualified resources (online as well as offline). A qualification may be determined based on the physical capability. For a 30-min. reserve, the resource may need to have the capability to move up the amount of cleared STR in 30 min.

Regional, load pockets, sub-regional, and/or local requirements for flexible capacity in load pockets or regions may be driven by several factors that include thermal limits, stability limits, voltage issues, and contractual requirements. Many of these needs may be represented as load pocket and regional STR needs. This includes the need to increase generator output following the loss of a generator or transmission element to restore flows within new N−1 security limits for the new system conditions within the STR response period. These STR needs may be represented in local-area flow-based transmission constraints combining cleared energy and STR to provide the needed response within the STR response period, similar to the reserve procurement enhancement (RPE) capability utilized for CR locational and deliverability constraints. These flow-based transmission constraints, which may be included in the market clearing processes, may take operating conditions into consideration to dynamically determine the needed STR in a load pocket, region, local area, and/or sub-region. The STR need in each local area (reserve zone) may be equal to the largest generation contingency in that zone. The sub-regional STR need may be determined by the RDT contractual limits.

A thermal limit may exist when exceeding it results in burning of the transmission line. A stability limit may exist when, by exceeding it, the system losses stability and runs into blackout. A voltage issue may be a voltage out of an acceptable range (e.g., too high or too low). A contractual requirement may be an agreement on transfer with neighbors. A new N−1 security limit may refer to a transmission flow limit, i.e., the flow should not exceed the limit. An example of a flow-based constraint taking operating conditions into consideration for these determinations may include a flow from a current energy dispatch or loop flow external generator output.

In some embodiments, voltage needs may be out of scope. Some load pocket needs, such as the need for Reactive Power capability, may not be directly related to the STR product (either dispatched energy or the potential to convert STR to energy within the STR response period). These exceptional needs may drive commitment within local areas but may not be represented as flow-based STR constraints. In such cases, other representations of the commitment requirements, beyond the scope of the STR product, may be needed. As such, the STR may not address such needs. The controller may continue to use existing methods, including operating guides and voltage and local reliability commitments, to manage such local needs.

Commitments related solely to reactive power support may be generally made outside of the market and resulted in approximately 10% of voltage and local reliability (VLR) related make-whole payments in 2018.

Herein describes design changes to incorporate the STR product into the controller's market. The design features for the STR product model may be divided into sections representing different the controller market aspects: Registration and Offer; STR Deployment; market commitment and dispatch; pricing; measurement and verification; and product settlement and cost allocation. This design may inform the detailed solution design, market system implementation, and process changes.

Now disclosed are registration and offer features. The STR product introduces a separate ancillary service provided by either online or offline resources. The controller's resources may indicate the capability and availability to provide STR through resource registration and offer parameters.

Now disclosed are certification of STR capability. Online STR capability may not require registration or qualification since any Resource dispatchable for energy may provide STR (excluding Dispatchable Intermittent Resources and Intermittent Resources). Market participants may elect to use a resource's hourly online STR Dispatch Status offer to indicate the resource may not be currently participating in online STR, but there is no registration parameter to specify online STR capability. Operators may be permitted to override the online STR Dispatch Status similar to Contingency Reserve.

All offline STR qualified resources must meet a minimum set of criteria including (1) registering as an offline STR qualified resource in the ISO energy and operating reserve markets; (2) having compatible operating capabilities such as but not limited to (a) capability of deploying 100% of cleared STR within the STR response period and for a minimum of 60 continuous minutes, (b) four hour (should be configurable) minimum run time or less, (c) capability of reaching economic minimum within 30 minutes, and (d) appropriate transmission arrangements for External Asynchronous Resources and pseudo-tied resources. Market participants may elect to use a resource's hourly Offline STR Dispatch Status offer to indicate the resource may not be currently participating in offline STR. Operators may be permitted to override the Offline STR Dispatch Status similar to Contingency Reserve.

To avoid a large number of offline capability tests around the initial implementation in the controller's markets, Market participants may be able to self-certify a resource's capability to provide offline STR by setting flags in registration for the initial implementation of the STR product. After the initial STR implementation, qualification to provide STR in the controller's markets may require an offline STR test to demonstrate the resource's capabilities. Offline STR tests may be conducted in a manner similar to offline supplemental tests. They may be requested by contacting the controller, through the balancing authority operator, and may be paid the ex post LMP for the MW produced. Offline supplemental testing may be described in 8.2.10.3 of BPM 002, which is available at https://www.misoenergy.org/legal/business-practice-manuals. However, if a resource has qualified to provide offline supplemental reserve, no additional testing is required for qualification of STR. Registered offline STR capable resources may be subject to performance testing through deployments and/or periodic tests. The registration for offline STR capability may be changed in quarterly updates.

All offline STR qualified resources should meet a minimum set of criteria including (1) registering as an offline STR qualified resource in the controller energy and operating reserve markets; (2) having compatible operating capabilities such as but not limited to (a) capability of deploying 100% of cleared STR within the STR response period and for a minimum continuous deployment duration, (b) sufficiently small minimum run time, and (c) appropriate transmission arrangements for External Asynchronous Resources and pseudo-tied resources. Electric Storage Resources may be included in design and implementation specifications where appropriate. They should be able to provide both online and offline STR.

Some embodiments may secure day-ahead resource eligibility. STR qualified resources in the day-ahead energy and operating reserve market may be the following: uncommitted offline STR qualified generation resources, stored energy resource—type II, and demand response resource (DRR)-type II Resources may provide offline STR; committed generation resources, stored energy resource—type II, and DRR-type II Resources may provide online STR (excluding Intermittent Resources and Dispatchable Intermittent Resources); STR qualified DRR-type I resources may provide offline STR; and available external asynchronous resources (EARs) may provide online STR.

The resource's offered hourly online and offline STR Dispatch Status may be set to "Economic" (or to "self-schedule"). Resources may not be able to self-schedule STR.

Disclosed embodiments secure real-time resource eligibility. STR qualified resources in the real-time energy and operating reserve market may be the following: uncommitted offline STR qualified generation resources, stored energy resource—type II, and DRR-type II Resources may provide offline STR; synchronized generation resources, stored energy resource—type II, and DRR-type II resources may provide online STR (excluding Intermittent Resources and Dispatchable Intermittent Resources); STR qualified DRR-type I resources may provide offline STR; and available EARs may provide online STR.

The resource's offered hourly online and offline STR Dispatch Status may be set to "Economic". Resources may not be able to self-schedule STR.

Disclosed embodiments may implement an STR offer structure. Offer parameters related to both online and offline STR may be accepted. STR offer prices may only be available for offline STR as no offer prices may be considered for online STR. Online STR uses the same resource energy output flexibility (i.e., ramping capability) provided by dispatchable resources. Similar to the RCP, no additional resource costs have been identified to provide online STR. STR offers include the following offer attributes: online and offline STR dispatch status—resources may use this flag to opt-out of participating in online and offline STR with valid options of "Economic" and "not participating;" offline STR offer price—the minimum STR price for which the offline STR would be cleared. Generators may submit a one-segment offer price, and DRR may submit a three-segment curve; and/or maximum offline STR response limit—the maximum offline STR that may be cleared on a participating generation resource, stored energy resource—type II, or DRR-type II. This represents the resource's maximum potential STR response within the STR response period. The target demand reduction level should also serve as the maximum offline response limit for DRR type I, similar to how CR may be handled. The maximum offline STR Response limit must be greater than or equal to its economic minimum dispatch. The maximum offline STR Response limit may be measured in MW.

Similar to the CR Offer Price allowable range which may also represent the costs of being available to start an offline resource, the initial range for Offline STR Offer Prices may be −$100.00/MW to +$100.00/MW.

Disclosed embodiments may facilitate STR deployment. In real-time operations, the UDS energy dispatch targets may include online STR deployment when STR is needed for load pocket and regional transmission constraint support as well as market-wide power balance support. Offline STR deployments may result in the controller-issued resource start instructions. These instructions may be transmitted to the resources by the market system through a communication link.

Disclosed embodiments may facilitate an online deployment methodology. Online STR may be deployed through UDS dispatch as energy when needed. Although the initial STR response may be delayed for several minutes by the required approval of a new post-contingency or post-event UDS case incorporating the system changes resulting in the need to use STR flexibility, the approach allows UDS to economically dispatch the needed amount of energy at various Resources in response to system conditions (e.g., following a loss of generation event or renewable forecast error event). 1. A loss of generation event may be a trip of a generator, and a transmission element outage may be a trip of a transmission line. There may always be errors in any forecast to future renewable output, there being no way to perfectly know what the wind will be in the future. The forecast tools may predict the renewable output within a certain error margin. Responding to the changing system conditions in each 5-minute interval, UDS may dynamically determine the needed MW response rather than relying on an initial or updated operator-determined value. The approach also allows LMPs to reflect the impact of STR deployment.

If STR deployment or clearing on a specific resource would cause reliability-related issues, e.g., a temporary deliverability issue, operators may temporarily disqualify resources from clearing STR. Operators should have the flexibility to disqualify resources.

Figure 1:
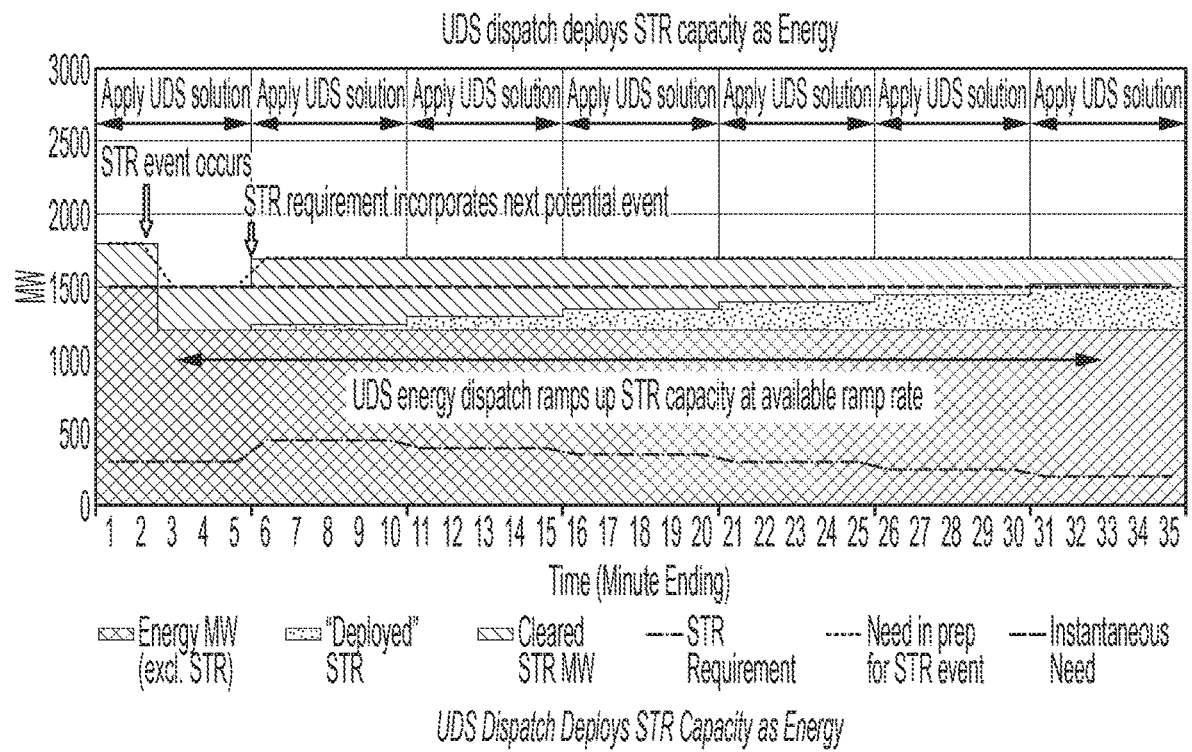
FIG. 1 illustrates a unit dispatch system (UDS) that deploys short-term reserve (STR) capacity as energy, in accordance with one or more embodiments.

FIG. 1 illustrates the approach for energy and STR dispatch in a load pocket or local area which, for simplicity, may be assumed to have a constant load for the duration of the example. In this illustration, the load pocket recovers to the instantaneous energy output need in the load pocket from the worst-case STR loss of generation event. After the initial event, UDS begins ramping up resource energy output and protects the system for the next most severe STR need in the load pocket, while also clearing the STR needed above the current ramp-limited STR response in each interval. FIG. 1 depicts UDS dispatch, which deploys STR capacity as energy.

Disclosed embodiments may facilitate an offline deployment methodology. Offline STR responses may be instructed by operator commitment of selected resources. The Trigger for offline STR deployment may be due to a contingency and/or congestion over transmission elements connecting a control area to the rest of the system. Contingency reserve deployment may not be changed. If a resource holds capacity for both CR and STR and is committed for CR, it may be considered a CR deployment and it may be measured and enforced as a CR deployment. STR deployment may continue after the 10-minute CR deployment period. If a resource is committed for STR, it may be designated as an STR commitment.

Like any other near-term commitment, the resource should synchronize and ramp up to minimum output before being released for UDS dispatch. If the ramp-up to minimum is completed before the end of the STR deployment period, the resource may make itself available for UDS dispatch. UDS may dispatch the resource's capacity as needed to meet the current operational needs which may use less than the full amount of its previously cleared offline STR. A resource may be able to provide STR, but only up to the amount that the resource may achieve within the STR deployment period, as specified in the STR Offer as the maximum offline STR Now disclosed are response limits. For example, operators may have tools available to help them determine the desired commitments including priority lists for quick selection of offline STR resources and reliability assessment commitment (RAC)/look-ahead commitment (LAC) tools for more detailed analysis if time allows. The display should show cleared online and offline STR for market-wide, sub-regional, and local needs and shall properly account for resources that may respond to multiple STR needs.

When STR is deployed, the operator may choose one of the following new commitment reasons: STR-VLR for voltage and reliability reasons, STR-SRPBC for RDT violations, and STR-ISO for any other market flexibility need.

If STR deployment or clearing on a specific resource would cause reliability-related issues, e.g., a temporary deliverability issue, operators may temporarily disqualify resources from clearing STR.

Some embodiments implement market commitment and dispatch. STR clearing may be determined for each resource in the market clearing commitment and dispatch processes. Participating online STR eligible resources may be dispatched in consideration of their opportunity cost of using available resource capabilities for other products. Offline STR participating resources may be dispatched based on their STR offer price. There may be no limitations requiring a certain portion of STR to be cleared from certain types of resources or as online or offline STR.

Zonal STR clearing for regional, load pocket, sub-regional, and/or local area needs and market-wide STR clearing may be subject to the application of STR demand curves and penalty prices (see below). When STR capability is insufficient and capacity is more economically used for serving energy and/or other products there may be an STR shortage and demand curves and penalty prices may participate in setting prices.

Equations provided herein may be symbolic in nature to communicate STR product features. The actual production formulation for STR product may differ from the formulation provided below and may be included later in Business Practice Manual (BPM)-002.

STR reserve requirements may be established at the market-wide, sub-regional, and/or local levels. Each sub-region or local area corresponds to one or more reserve zones. Transmission constraints may be the same as the current RPE constraints and TSP studies may continue to define constraints with quarterly updates or more frequently if needed. It may be anticipated that STR constraints may replace existing CR RPE constraints, but some CR RPE constraints may still be needed. The cleared STR that meets the needs of a local area may also be counted on for a Sub-Region that contains the local area as well as the market-wide requirement. Market-wide requirements may be specified based on potential resource output needed in the STR response period to react to changes in system conditions. The market-wide STR requirement may be based on offline analysis and provided to the market clearing functions with a compatible demand curve. A curve may be compatible by reflecting the priorities of operational needs. For example, meeting current energy balance may be more important than clearing STR. This requirement and curve being provided to a market clearing function may be defined in the market database based on market rules and be sent to the clearing engine through an input file. The market clearing function may clear to maximize the value of the demand curve which may be served by resources with opportunity costs and offer costs below the demand curve value. The market-wide STR needs represented as cleared demand curve steps at different prices may be fulfilled by the local STR requirements which may be in turn fulfilled by resources in each local area (reserve zone). For example, $20/MWh may be for the first 50 MW shortage, and $100/MWh may be for more than a 50 MW shortage. As presented below, an ISO may provide a single-step demand curve although a multi-step demand curve is also contemplated.

$$STR_{DCmax_{step,t}} \geq STR_{DC_{step,t}}$$

$$\sum_{z \in kScope} ZminSTR_{z,t} \geq \sum_{step} STR_{DC_{step,t}}$$

While the STR-related flow-based transmission constraints define local or sub-regional transmission limitations (See below), the STR required in the local area or Sub-Region may vary depending on the energy-based constraint impact due to resource dispatch. The resources within each zone contribute to meeting the reserve zone's STR minimum requirement.

$$\sum_{r \in R_z} \left( STR_{r,t}^{online} + STR_{r,t}^{offline} \right) \geq ZminSTR_{z,t}$$

A resource's cleared STR may be applied to satisfying market-wide STR requirements and each local and sub-regional STR requirement for which the resource's zone participates. With this assumption, if multiple STR needs materialized concurrently, there may not be sufficient STR response to satisfy all requirements. This assumption, however, provides the desired STR capability without additional costs to support the unlikely situation of multiple concurrent STR needs.

Disclosed embodiments contemplate post-event power balance constraints. Post-event power balance constraints maintain power balance with the consideration of STR deployment and zonal events. The post-event power balance may be enforced for each STR event. Local and sub-regional STR needs may be satisfied by energy dispatch and/or STR dispatch to satisfy the local response required for local or sub-regional transmission constraints within the STR response period (see below). Energy dispatch may be cleared for meeting current load balance, and STR dispatch may be an insurance cleared to prepare for a contingency event (e.g., trip of a generator and/or transmission line).

$$\sum_{z \in kScope} STRResponse_{z,e,t} + ZNeedViolSTR\_Pos_{z,e,t} -$$

$$ZNeedViolSTR\_Neg_{z,e,t} = ZNeedSTR_{e,t} \forall e$$

$$ZNeedViolSTR\_Pos_{z,e,t}, ZNeedViolSTR\_Neg_{z,e,t} \geq 0$$

The corresponding shadow price of the post-event power balance constraint may be $\varepsilon_{e,t}$. ZNeedViolSTR_Pos$_{z,k,t}$ and ZNeedViolSTR_Neg$_{z,k,t}$ may be slack variables for positive violation direction and negative violation direction.

Disclosed embodiments may implement reserve procurement enhancement (RPE). RPE constraints prevent security constraint violation after the deployment of STR. RPE constraints only apply to the security constraints, which may prevent STR deliverability. The use of flow-based transmission constraints describing conditions following STR deployment (similar to RPE constraints for CR) allows the local and sub-regional STR needs to be identified dynamically within the market clearing dispatch.

$$FlowSystemEnergy_{k,t} + \sum_{z \in kScope} STRResponse_{z,e,t} * ZSTRSens_{z,e,t} -$$

$$ZNeedSTR_{e,t} * STRNeedSens_{e,t} \leq$$

$$STRLimit_{k,t} + TransLimitViolSTR_{k,e,t} \forall k, e$$

or $$FlowSystemEnergy_{k,t} + \sum_{z \in kScope} STRResponse_{z,e,t} * ZSTRSens_{z,e,t} -$$

$$ZNeedSTR_{e,t} * STRNeedSens_{e,t} \geq$$

$$STRLimit_{k,t} - TransLimitViolSTR_{k,e,t} \forall k, e$$

$$TransLimitViolSTR_{k,e,t} \geq 0$$

STRNeedSens$_{z,k,t}$: Constraint flow sensitivity of the STR need for STR transmission constraint k for time t.

STRNeedSens$_{k,e,t}$=Sens$_{k,e,t}\forall k,e$

ZSTRSens$_{z,k,t}$: Zonal STR response sensitivity to STR transmission constraint k for time t.

$$ZSTRSens_{k,z,t} = \frac{\sum_{r \in R_z^{ON}} Ramp_{r,t}^{STR} * Sens_{k,r,t} + \sum_{r \in R_z^{OFF}} MaxOfflineSTR_{r,t} * Sens_{k,r,t}}{\sum_{r \in R_z^{ON}} Ramp_{r,t}^{STR} + \sum_{r \in R_z^{OFF}} MaxOfflineSTR_{r,t}} \forall k, z$$

TransLimitViolSTR$_{k,e,t}$ may be the slack variable for RPE constraint. The corresponding shadow price may be $\sigma_{k,e,t}$.

Disclosed embodiments contemplate event exclusive constraints. Since modeled events may not happen at the same time, only the highest violation cost may be chosen by EventPenalty$_t$. This demand curve design may avoid exaggerating the value of STR transmission constraints on the same security constraint.

$$EventPenalty_t \geq \sum_k TransLimitViolSTR_{k,e,t} * TransLimitSTRPenPrice_{k,t} +$$

$$\left( ZNeedViolSTR_{Pos_{z,e,t}} + ZNeedViolSTR_{Neg_{z,e,t}} \right) * ZNeedPenPrice_{e,t} \forall e$$

Disclosed embodiments contemplate market clearing objective function changes. The STR product may introduce the following new components to be considered in the market clearing objective function (sign conventions below assume an objective function minimization formulation): STR Offer Cost—with no offers submitted for online STR, only offline STR offer costs may be considered to ensure that the most economic STR may be cleared to satisfy STR needs.

$$\sum_r \sum_t STR_{r,t}^{offline} * STROffer_{r,t}^{offline}$$

STR Demand Curve—the market-wide demand curve value should be optimized to ensure market-wide STR needs may be met when the cost of procurement may be less than the demand curve price.

$$-\sum_{step} \sum_t (STRPrice_{DC_{step,t}} * STR_{DC_{step,t}})$$

STR Event Penalty cost—the STR transmission constraint violation cost acts as the penalty price for a local area or sub-region and the post-event power balance. This penalty price represents the value of clearing local area or sub-regional STR.

$$\sum_t EventPenalty_t$$

Disclosed embodiments implement an online STR resource capacity model. STR cleared on a resource reflects its potential to increase its energy output through UDS dispatch in future intervals. A resource's STR response may be limited by its current cleared energy and regulation reserve relative to its dispatch maximum, i.e., its regulation maximum operating limit when on regulation or its economic maximum operating limit when not regulating.

Disclosed embodiments contemplate resource capacity constraints. Because the STR response period may be beyond the typical CR and RCP response times, CR and the Up Ramp Capability (URC) capacity may be allowed to overlap with cleared STR. CR and URC deployments convert capacity to energy in a shorter time period than STR. The capacity cleared for CR and URC in the current interval may be therefore assumed to not interfere with the STR response. If the cleared CR or URC is deployed, the capacity may be converted to energy, and the STR response may continue within the longer STR response period when the deployment of the other products is complete. If the cleared CR or URC is not deployed, the future interval dispatch recognizing an increased need for energy may convert the STR capacity to energy while shifting the CR and/or URC to other resources (or even clearing with shortages) as needed.

An additional current interval resource capacity constraint may be introduced to the market clearing function for generation resources, stored energy resources—type II, DRRs-type II, and EARs. $Energy_{r,t}$ may be the energy dispatch on resource r at interval t, with r being a resource and t being an interval. $Reg_{r,t}$ may be the regulating reserve dispatch on resource r at interval t. And $STR_{r,t}^{online}$ may be the STR dispatch on resource r at interval t.

$$Energy_{r,t} + Reg_{r,t} + STR_{r,t}^{online} \leq \kappa_{r,t} * Pmax_{r,t} - \rho_{r,t}(Pmax_{r,t} - Pregmax_{r,t})$$

Disclosed embodiments contemplate resource headroom capacity constraints. Applied in the Security Constrained Unit Commitment (SCUC), the "headroom" constraint models the need to commit enough capacity for the instantaneous peak demand above the scheduled average energy within a commitment time period. The existing "headroom" constraints have configurable parameters describing how regulation and contingency reserve may be considered in the capacity requirement. The existing "headroom" constraint may be described by the following formula for generation resources, stored energy resources—type II, DRRs-type II, and EARs.

$$Headroom_{r,t} \leq \kappa_{r,t} * Pmax_{r,t} - \rho_{r,t}(Pmax_{r,t} - Pregmax_{r,t})$$

$$HeadroomRegFactor*Reg_{r,t} - HeadroomContResFactor*(Spin_{r,t} + Supp_{r,t}^{online}) - Energy_{r,t}$$

Following a similar approach and noting that STR and CR may be allowed to overlap in their use of capacity, a new similar "headroom" constraint for generation resources, stored energy resources—type II, DRRs-type II, and EARs may be developed for STR reflecting that sufficient capacity should be available to serve STR needs across the instantaneous peak.

$$Headroom_{r,t} \leq \kappa_{r,t} * Pmax_{r,t} - \rho_{r,t}(Pmax_{r,t} - Pregmax_{r,t}) - HeadroomRegFactor*Reg_{r,t} - HeadroomSTRFactor*STR_{r,t}^{online} - Energy_{r,t}$$

Disclosed embodiments implement an online STR resource ramp model. In addition to being limited by resource capacity, online STR may be limited by the rate at which it may increase its energy output over the STR response period. The ramp rate used to determine the resource's STR capability should represent the modeled response the resource may achieve over the STR response period. The STR applicable ramp rate ($Ramp_{r,t}^{STR}$) should be calculated considering the changes in ramp rate as the resource provides the STR response: (i) when in regulation mode, the bi-directional ramp rate applies to upward ramp, i.e., if the resource is not regulating, the offered Directional-Up Ramp Rate applies; (ii) although forward studies use a single average ramp rate over the dispatchable capacity of a resource, real-time dispatch may use a MW-dependent ramp rate curve which should be considered in calculating how far the resource may ramp in the STR response period.

As with other products, the resource ramp rate may be shared between products such that the full ramp rate is available to each product individually. Also patterned from other ancillary services, the STR ramp rate constraint includes a STR ramp multiplier as a tuning parameter that may be used to represent the achievable response rate within the STR response period relative to the offer.

The STR resource ramp rate constraint includes consideration of whether the resource is participating in STR clearing to the extent that "not participating" STR Dispatch Status or other non-participation reasons may be present. Operator STR disqualification for temporary reliability issues may be an example of a non-participation reason. The following constraint may apply for generation resources, stored energy resources—type II, DRRs-type II, and EARs.

$$[STRRampMult/STRDeployTime]*STR_{r,t}^{online} \leq STR\text{-}Partic_{r,t}^{online} * [\kappa_{r,t}] * Ramp_{r,t}^{STR}$$

Disclosed embodiments contemplate an online STR prior to shut down. Resources scheduled to come offline within the STR response period may not be available to provide response for the required STR response period. Under some conditions, it may be desirable to modify the commitment schedule, such as extending a resource commitment, to ensure there may be sufficient capacity to provide the needed reliability over the STR response period. Although not applied to the market-clearing dispatch in the day-ahead and real-time markets to avoid market dispatch inefficiencies, a constraint may be added to RAC/LAC and Day Ahead analyses to ensure that sufficient capacity is scheduled to be online for the duration of STR response period following the current interval. The following constraint, or similar form applicable a particular study type, may apply for generation resources, stored energy resources—type II, DRRs-type II, and EARs.

$$\sum_{t_1=t_{1st\ overlap}}^{t-1} STR_{r,t_1}^{online} \leq \kappa_{r,t} * \sum_{t_1=t_{1st\ overlap}}^{t-1} (P\max_{r,t_1} - P\min_{r,t_1})$$

$t_{1st\ overlap}$ indicates the earliest interval which may be fully or partially within the STR response period of the beginning of interval t, and $\kappa_{r,t}=0$ when the resource is not committed. When the STR response period is 30 minutes and the study interval duration is one hour, the constraint may apply to the one hour prior to a resource shutdown. When the study interval duration is less than the STR response period, multiple intervals before a shutdown may be excluded from clearing STR. A shutdown may indicate a shut-down of a resource. If a resource is shutdown in 10 minutes, it may be excluded from clearing STR because it may not be online after 30 min.

Disclosed embodiments contemplate offline STR resource constraints. Registered offline generation resources, stored energy resources—type II, and DRRs-type II that may come online and produce energy within the STR response period may be eligible to clear offline STR. DRR-type I resources may not be dispatchable for energy; they either (1) produce energy at their targeted demand reduction level or (2) produce no energy and may be eligible for reserves. Due to UDS not being able to dispatch DRR-type I energy to deploy STR, DRRs-type I may be only able to clear offline STR. The eligible resources that may be participating in the STR product may clear STR up to their offered maximum offline STR Response Limit (the energy output level that they may reliably achieve within the STR response period), after they have met their minimum down time and may be available for commitment.

The portion of total market-wide, local, or sub-regional STR which may be provided by offline STR is not capped.

Disclosed embodiments contemplate offline STR resource capacity constraints. The offline STR capability constraint also includes consideration of whether the resource is participating in STR clearing. "not participating" STR Dispatch Status, not having met minimum down time in UDS, and any other participation criteria may be accommodated by the STR participation flag.

Pending further consideration of reliability impacts of offline CR and STR deployments, the following formula may be applied to generation resources, stored energy resources—type II, and DRRs-type II and assumes offline STR may be cleared simultaneously with CR since it may not restrict the simultaneous clearing of both CR and STR on the same resource.

$$STR_{r,t}^{offline} \leq STRPartic_{r,t}^{offline} * [1-\kappa_{r,t}] * MaxOfflineSTR_{r,t}$$

The following similar formula may be applied to DRRs-type I which limits cleared STR by the Targeted Demand Reduction Level for the DRR-type I resource.

$$STR_{r,t}^{offline} \leq STRPartic_{r,t}^{offline} * [1-\kappa_{r,t}] * TargetDemRedLevel_{r,t}$$

Disclosed embodiments contemplate offline STR and minimum down time constraints. A generation resource, stored energy resource—type II, or DRR-type II may not be restarted until it has been offline since its last commitment for at least its offered minimum down time. Similarly, a DRR-type I not producing energy may not produce energy again until it has satisfied its Minimum Non-Interruption Interval. Thus, a resource providing offline STR may not be able to provide STR until it has met its minimum down time (or Minimum Non-Interruption Interval) such that it is able to provide energy for the needed STR response. For the UDS, pre-processing validation of offered minimum down time or Minimum Non-Interruption Interval may determine resource STR participation eligibility to help determine the offline STR participation flag in the offline STR capacity constraints described above. The additional minimum down time or Minimum Non-Interruption Interval constraint described herein may not be needed for UDS. In forward studies (i.e., the day-ahead market and RAC/LAC analysis), constraints may be applied to ensure the resource's minimum down time or Minimum Non-Interruption Interval has been met before it may clear offline STR.

Disclosed embodiments contemplate local area STR transmission constraints. Requirements for flexible capacity in local areas and Sub-Regions may be driven by several causes including thermal limits, stability limits, voltage issues, and contractual requirements. Many of these needs may be represented as local or sub-regional STR needs. This includes the need to increase generator output following the loss of a generator to restore flows within new G-1 security limits for the new system conditions within the STR response period. These STR needs may be represented in local or sub-regional flow-based transmission constraints combining cleared energy and STR to provide the needed response within the STR response period.

$$FlowSystemEnergy_{k,t} + \sum_{z \in kScope} STRResponse_{k,z,t} * ZSTRSens_{k,z,t} -$$

$$ZNeedSTR_{k,t} * STRNeedSens_{k,t} \leq$$

$$STRLimit_{k,t} + \sum_{step} TransLimitViolSTR_{k,step,t}$$

$$TransLimitViolSTR_{max_{k,step,t}} \geq TransLimitViolSTR_{k,step,t}$$

In this constraint type, the energy flow includes the flow-based model for energy only constraints (including error correction terms to bias the flow to observed/expected system conditions). The local STR need in this formula models the change in flow on this constraint anticipated due to the loss of a generator which must be recovered within the STR response period. The local STR need in this constraint may be provided to the market clearing process as an input. The STR response provided by resources in the local area or sub-region identified as within the constrained scope of this constraint (e.g., the sub-regional RDT constraint includes all reserve zones in the South Region) may be considered in this constraint since the STR may be converted to energy within the STR response period.

Because the STR response period represented in this formula may be beyond the typical regulation, CR, and RCP response times, they may not be considered in calculating the flow relative to the STR constraint limit. For example, the typical CR response lasts 10 minutes. During a CR response, the resource may be ramping to provide energy and CR. In Real Time, when the resource has finished its CR response, it may continue ramping up its output to provide the STR response by the end of the STR response period. If the cleared CR is not deployed when the STR need arises, the next UDS may immediately begin ramping up the resource output, including moving the cleared CR to a different resource if needed. Additionally, when reserve procurement constraints may be used to manage zonal CR and/or URC product, conversion to energy impacts all CR, URC, and STR transmission constraints and generally reduces the local requirements for all of these products.

The resources may participate in more than one STR constraint. For example, there may be local areas that may be also part of a Sub-Region, such as the western reserve zone, which may be also within the larger South Sub-Region defined by the RDT constraint. The resources may be dispatched in the most economical way to meet all applicable STR constraints. If there is more than one binding STR constraint impacting a reserve zone, the zonal STR price may reflect the impacts of all binding STR constraints.

Some local needs for resources, such as Reactive Power capability, may not be directly related to energy (either dispatched energy or the potential to convert STR to energy within the STR response period). These exceptional constraints may drive specific resource commitments but may not be represented as flow-based STR-related constraints. In such cases, other representations of the commitment requirements, beyond the scope of the STR product, may be needed. As such, the STR product developed here may not address such needs. An ISO may continue to use existing methods to manage these needs.

STR market clearing prices (MCPs) for a resource may be determined by the shadow price of the new reserve zone STR minimum requirement constraint. Under normal operating conditions, this shadow price may be indicative of the marginal cost of supplying the required STR as determined by online STR opportunity cost or offline STR offer price. When there is insufficient STR cleared to meet STR needs, the demand curve and/or penalty price associated with the unmet market-wide, local, and/or sub-regional STR requirement may also impact the STR MCP causing STR scarcity pricing. One or more examples of using a demand curve to adjust MCP may reflect, if the demand curve for STR is set at $100/MWh and there is not enough resource to clear STR, the $100/MWh willing to buy price.

Disclosed embodiments contemplate scarcity pricing, which may result if the required level of STR may not be cleared below the demand curve or penalty price, and demand curves/penalty prices. In general, demand curves and penalty prices may be used to appropriately price shortage scenarios. An ISO may conduct simulations to establish demand curves and penalty prices that may be high enough to reflect the cost of scarcity but not so high that STR is prioritized over energy, and in some cases market-wide regulation. Because STR may be converted to energy in a future UDS dispatch when the flexibility represented by STR may be needed, the demand curve or penalty price should be low enough that the available capacity may be used for energy when needed, even if there is not enough capacity to clear STR on a different resource.

The STR product may be designed to ensure sufficient 30-minute online or offline rampable capacity for three types of STR needs: local, sub-regional, and market-wide. When a resource participates in supplying market-wide, sub-regional and local STR constraints, the impact of the market-wide STR demand curve and STR constraint penalty prices may be additive when there may be multiple shortages.

Approximately 864 production simulation cases were run in order to determine appropriate demand curve for market-wide needs, and penalty prices for local and sub-regional needs. For simplicity, an ISO may be using a single-step demand curve for the market-wide STR need and penalty prices for the local and sub-regional needs. An ISO may evaluate effectiveness of an STR demand curves and penalty prices in post implementation analysis. The ISO may also consider adopting multi-level demand curves for STR, if it is needed in the future.

Disclosed embodiments may provide an STR demand curve and penalty price summary.

TABLE 1

| STR TYPE | DEMAND CURVE VALUE/PENALTY PRICE | STR NEED |
|---|---|---|
| MARKET-WIDE (ZONES 1-8) | $100/MW | 1.5 × Largest Generator Contingency |
| SUB-REGIONAL | $60/MW | 1 × Largest Generator Contingency |
| LOCAL | $60/MW | 1 × Largest Generator Contingency |

Disclosed embodiments implement a market-wide (managing uncertainty) demand curve. Market-wide demand curves may be used to specify the level of expense to which the system may be dispatched to provide market-wide STR capability. The market-wide STR need may be cleared in any location in the ISO footprint. An ISO may select a single-step demand curve set at $100 for the market-wide STR need. If the market is scarce on the market-wide STR need, the STR MCP may be set to $100. Since the market-wide STR need may be met from resources in any zone, in scarcity, the penalty price of $100 applies in all zones (1-8).

Disclosed embodiments contemplate sub-regional (RDT Management) penalty pricing. The sub-regional STR need may be a locational need to manage the RDT constraint between different regions of an ISO. Sub-regional STR in this case may be cleared in any location in the respective Sub-Regions. An ISO may select a penalty price set at $60 for the sub-regional STR need. If the Sub-Region is scarce on the dynamically determined sub-regional requirement (for instance, for the South Sub-Region, the sub-regional requirement may be based on RDT limits and largest contingency in Zones 6, 7 and 8), the $60 penalty price may be applied to the respective Sub-Region.

Disclosed embodiments contemplate local area (managing local import constraints) penalty pricing. The local STR needs in this case may only be cleared in a specific local area. Similar to the sub-regional STR penalty price, an ISO may select a penalty price set at $60 for local STR needs. If the reserve zone is scarce on the dynamically determined local requirement, the STR MCP price may be set to $60 penalty price in the Zone.

Disclosed embodiments contemplate ELMP considerations. An ISO's ex post pricing approach uses the Extended Locational Marginal Pricing (ELMP) mechanism that allows the costs of committing Fast Start Resources, the energy cost of Fast Start Resources dispatched at limits and Emergency Demand Response Resources to set price. Other than special consideration for flexible resources, the dispatch solved by the ex post pricing approach may be the same dispatch solved in in the Ex Ante dispatch. An example of these considerations may be a part of the market rule on ELMP. The introduction of the STR product may not change the definition of Fast Start Resources and other special conditions defined for the ELMP mechanism. The only change to the ELMP process may be the formulation changes for clearing STR as used in the Ex Ante process and described above. With this approach, the commitment costs from Fast Start Resources incorporated in the ELMP algorithm may impact STR prices similar to the impact these costs may have on other market prices.

Disclosed embodiments contemplate measurement and verification. Resource providing online and offline STR may be ramped up in response to STR needs in different ways: (i) online STR capacity may be converted to increased energy output through UDS energy dispatch to meet STR needs, the UDS energy dispatch being a single quantity representing STR and other system needs and not providing a specific STR component of the energy dispatch quantity; and/or (ii) resources deployed for offline STR may be explicitly started by operators when their response is needed for STR needs.

Due to the differences in online and offline approaches, the verification that a resource met its STR obligations may be different for online and offline STR. Online resources may need to follow a 5-min. dispatch target to move up or down. An offline resource may need to follow the commitment instruction to start up.

Disclosed embodiments contemplate online STR performance monitoring. Online STR response may be embedded in a resource's UDS energy instruction and UDS may or may not dispatch resources on which STR was cleared as system conditions change during the STR response period. Consequently, there may be no separate confirmation of online STR performance. The overall real-time resource performance relative to its dispatch instructions may be measured and subject to the existing uninstructed deviation penalties if the resource may not respond as instructed. STR clearing may consider resource capabilities in the current interval to ensure that the cleared STR is consistent with the anticipated resource capabilities.

Disclosed embodiments contemplate offline STR performance monitoring. Offline STR response for a STR need may receive commitment instructions. The commitment instruction and UDS treatment during startup may be the same as any other resource beginning to produce energy in response to a commitment instruction. Depending on the start-up and notification time of the resource, it may reach its minimum before the end of the STR response period and become dispatchable within UDS. If the resource does not reach its minimum within the STR response period, the output achieved during its start-up sequence may be counted toward its STR response.

When the resource reaches its minimum and becomes dispatchable, UDS may not dispatch the resource to its maximum potential within the STR response period. In this case, the resource may not get the opportunity to demonstrate its STR response capability. The resource STR response may be considered met if the resource reaches its minimum and becomes dispatchable.

Each resource may be evaluated on an individual basis. The common bus logic used for CR may not be applied for STR evaluation. Due to the length of the STR response period, an ISO may have time to coordinate the response from another resource if a resource committed for STR is not able to respond. The STR approach differs from the CR approach where the shorter CR response time does not provide as much time for coordination with the ISO and the participant may decide to use a resource at the same common bus to provide the CR response. A resource which may not be able to provide the cleared offline STR after receiving a commitment instruction should coordinate with the ISO enabling the ISO to select a different resource to provide the needed STR response. If the resource fails to meet at least one of these criteria, it may be subject to excessive/deficient energy deployment charges and STR deployment failure charges.

In the event of an STR deployment failure, the market participant would be responsible for buying back its day-ahead position in the hour of failure and the remaining hours of the operating day. The amount of STR available for payment on that Resource shall be restricted to zero (0) in the Hour of deployment failure and for the remaining Hours in the Operating Day. STR clearing may not be capped, but may be disqualified by the operator.

Disclosed embodiments contemplate product settlement and cost allocation. The introduction of a new product may require changes to settlements in the form of new calculations and changes to existing calculations. Resources that clear STR may be paid their respective STR MCPs. The costs of these STR payments may be allocated by Asset Owner load ratio share using Binding Settlement Zones similar to the cost allocation for other types of reserves. Additionally, the introduction of a STR product may impact make-whole payment eligibility criteria and cost allocations. Herein describes the STR payments and allocations related directly to the new STR product and the impacts on make-whole payments. Ongoing settlements and cost allocation enhancements may have implications for the STR product. For example, Tariff provisions to address the real-time Buybacks of Spinning and Offline Supplemental Reserve should be considered for STR once implemented for other products.

Disclosed embodiments contemplate STR product payments to suppliers. STR represents a new product yet one that is similar to the ancillary services (AS) products in the current ISO energy and operating reserves markets. Like other ancillary services, suppliers may be paid the applicable STR MCP. Accordingly, a primary objective of ancillary services markets may be: without ancillary services markets, there may be no transparent economic signals to govern the provision of these services. Ancillary services markets may reconcile operating practices with market incentives so that market participants may be compensated for providing reliability. Ancillary services markets may reduce need for operators to maintain reliability through out-of-merit actions. Correctly pricing energy and operating reserve services under shortage conditions may be important for resource adequacy in an energy-only market.

Operating reserves may comprise one or more products, such as regulation, spinning reserve, and supplemental reserve. Regulation response services, also known as automatic generation control (AGC), allow the system operator to physically balance supply and demand on a real-time, moment-to-moment basis. This may be accomplished by a resource adjusting its output in response to a control signal. AGC may be a software application that generates and transmits real-time control signals. Spinning reserve may be used to provide energy to meet demand on the system in the event of a sudden and unexpected loss of a generation or transmission resource. Capability of generation resources or other qualified resources already synchronized to the grid to reach their targeted output within 10 minutes. Some embodiments may provide contingency reserves, which may be accomplished by resources holding back or reserving a specified percentage of their capacity to meet the emergency need. Supplemental reserve may be used to provide energy to meet demand on the system in the event of a sudden and unexpected loss of a generation or transmission resource. Provided by generation resources, or other qualified resources, already synchronized or not currently synchronized to the grid, but which may be ramped up to supply energy within 10 minutes.

In the day-ahead market, the settled STR volume in an interval may be the cleared STR. In real-time settlement, the settled STR volume in an interval may be the difference between real-time and day-ahead cleared STR volumes. The day-ahead market MCP and real-time MCP for the resource's zone may be the applicable prices for the day-ahead and real-time markets, respectively.

The new STR product may require new billing determinants and payment charge types as described below.

Disclosed embodiments contemplate new STR billing determinants. With STR clearing in both the day-ahead and real-time markets, the new STR charge types may be similar to existing ancillary services. The billing determinants for each resource providing STR may be the following: DA_STR_MW—DA cleared STR; DA_STR_MCP—DA market clearing price for STR; RT_STR_MW—RT cleared STR; and/or RT_STR_MCP—RT market clearing price for STR.

Disclosed embodiments contemplate new resource STR payment charge types. Resources providing STR may be paid based on how much they clear. Using the determinants above, the following new charge types for resource STR payments may be: DA_STR—charge type to pay for cleared STR in the DA market; and/or RT_STR—charge type to pay for the imbalance between cleared STR in the RT market and cleared STR in the DA market The formulations for these new charge types may be calculated as the product of cleared quantity and price: DA_STR=DA_STR_MW*DA_STR_MCP; RT_STR= (RT_STR_MW−DA_STR_MW)*RT_STR_MCP; and/or STR DIST=DA_STR+RT_STR.

Disclosed embodiments contemplate STR cost allocation. The costs of STR payments may be allocated to Asset Owner load and exports within reserve zones, on a zonal basis similar to the cost allocation process for CR. Following the existing design, the distribution of STR costs identified as associated with binding local or sub-regional STR needs may be based on a Binding Settlement Zone allocation approach. Under this approach, an Asset Owner's load ratio share within a grouped set of zones identified by a common set of binding constraints impacting the STR requirement may be used to allocate the cost of STR payments made to resources within the binding zone.

Disclosed embodiments contemplate make-whole payment eligibility impact. Make-whole payments may be paid to eligible STR qualified online resources. Similar to RCP, no online STR offer costs may be accepted since online STR may be provided by the dispatchability of resources for energy. Given this, a STR qualified resource opting-out of online STR eligibility may be voluntarily turning down an opportunity for additional revenue for no additional cost. Similar to opting-out of participating in the RCP, voluntarily accepting less revenue may be deemed to relieve an ISO from its obligation for certain make-whole payments.

Disclosed embodiments contemplate day-ahead revenue sufficiency guarantee payment (RSG) eligibility. Eligibility for day-ahead RSG may not be impacted by STR availability.

Disclosed embodiments contemplate real-time RSG eligibility. The real-time RSG Full Payment Eligibility Criteria may be extended to require that, for units capable of clearing online STR based on real-time conditions, the real-time online STR Dispatch Status must be Economic (EC) for the resource to remain eligible.

Disclosed embodiments contemplate real-time offer revenue sufficiency guarantee payment (RTORSGP) eligibility. The RTORSGP eligibility criteria for STR qualified resources with a day-ahead commitment period may be extended to add, in addition to the existing criteria, both (1) the day-ahead online STR dispatch status must be economic (EC) for units capable of clearing online STR based on day-ahead conditions and (2) the real-time online STR dispatch status must be Economic (EC) for units capable of clearing online STR based on real-time conditions.

The RTORSGP eligibility criteria for a real-time must run commitment period may be extended to add, in addition to the existing criteria, the real-time online STR Dispatch Status must be Economic (EC) for units capable of clearing online STR based on real-time conditions.

Disclosed embodiments contemplate day-ahead margin assurance payment (DAMAP) eligibility.

The day-ahead margin assurance payment eligibility criteria for a day-ahead committed hour may be extended to add, in addition to the existing criteria, both (1) the day-ahead online STR dispatch status must be economic (EC) for units capable of clearing online STR based on day-ahead conditions and (2) the real-time online STR dispatch status must be economic (EC) for units capable of clearing online STR based on real-time conditions.

Disclosed embodiments contemplate make-whole payment calculation impact. Fundamentally, the approach to make-whole payments may be that if a make-whole payment eligible resource's as-offered production cost less its market revenue for all products may be positive, the difference may be reimbursed to the resource in the form of a make-whole payment. The STR product may provide new revenue stream to resources which should be considered in the calculation of make-whole payments.

The implementation of STR may not include availability offers for online STR capability. Unlike other ancillary services, no offer cost component for online STR may be considered in make-whole payment calculations Offline STR would qualify for inclusion in a make-whole payments similar to the treatment of Contingency Reserve revenue for real-time revenue sufficiency guarantee payment. The additional STR revenues for a resource may be incorporated in the day-ahead revenue sufficiency guarantee payment, real-time revenue sufficiency guarantee payment, real-time offer revenue sufficiency guarantee payment, and day-ahead margin assurance payment make-whole payment formulations.

Disclosed embodiments contemplate make whole payment cost allocation. Although STR payments received by a resource may impact the magnitude of its make-whole payment, the approach for allocating price volatility make-whole payments and Revenue Sufficiency Guarantee (RSG) payments allocated system wide may not be changed by the STR implementation.

The method for allocating RSG payments locally may retain its current philosophical approach. As part of a commitment process, changes associated with implementing the STR product and/or commitment reasons that associate commitments with local or sub-regional needs may be determined by the SCUC optimization software. These commitment reasons for local or sub-regional needs may be treated like operator entered local or sub-regional commitment reasons in settlement calculations. With equivalent settlements treatment for SCUC-determined and operator-entered local reliability reasons, there may be minimal changes to the method for local allocation of day-ahead and real-time RSG payments. Depending on the detailed design for implementation, changes may include extensions to accommodate new commitment reasons. Using the existing RSG allocation approach, the make-whole payment to resources associated with commitments for local or sub-regional needs may then be allocated based on load ratio share in the associated area.

Disclosed embodiments contemplate offline STR deployment failure charge. When a shortfall in an offline STR deployment is determined for a specific resource, the resource may be subject to the new offline STR deployment failure charge which may be equal to the shortfall amount times the energy LMP at the resource's commercial pricing node. The collected amounts of STR deployment failure charges may be dispersed to Asset Owners through Revenue Neutrality Uplift.

Disclosed embodiments contemplate online STR revenue clawback within the uninstructed deviation penalty. If a resource fails to follow dispatch in a given hour, the Resource would receive an excessive deficient energy deployment charge. The excessive deficient energy deployment charge may be updated to include the claw back of any day-ahead and real-time STR credits for that hour.

Disclosed embodiments contemplate market monitoring and mitigation. Market monitoring and mitigation provisions for STR may be established for offer parameters and offered capability similar to existing reserve product offers.

Disclosed embodiments contemplate obligation for capacity resources. Capacity resources that may be qualified to provide STR may have a must offer obligation for STR similar to that of CR.

Disclosed embodiments contemplate production simulation. An ISO may develop a prototype of the real-time market in order to simulate the addition of a STR product. In order to study the effects of adding a STR product to a particular market day, market-wide, sub-regional and local STR needs may be added. Resulting requirements may be determined dynamically in the UDS, as exemplarily depicted in Table 2.

TABLE 2

| | STR NEED | PURPOSE |
| --- | --- | --- |
| MARKET-WIDE | Requirement of 1.5 × the largest generator (G1 × 1.5) | To manage Market-Wide uncertainty |
| SUB-REGIONAL | CR RPE requirements may be disabled and STR Sub-Regional requirements may be enabled on the same sub-regional RPE definition | To manage the RDT from different regions of an ISO |

TABLE 2-continued

| | STR NEED | PURPOSE |
| --- | --- | --- |
| LOCAL | STR Local RPE requirements may be enabled | To manage import limitations into Amite South and WOTAB Reserve Zones |

Because STR offers may not be available in the current market, STR offers were simulated. Offline units offering supplemental reserves may be assumed to offer equivalent MW of STR at the same offer price.

An ISO may use a prototype to study the effect of an STR product in the Real Time (RT) and Day Ahead (DA) markets. A region of the ISO may have capacity constrained and RDT may be bound during most of the market intervals. In day-ahead, the market interval is measured in hourly intervals, but in real time it is measured in 5-min. intervals. By adding STR to the RT market, production costs may be lowered by approximately $108,000 (excluding commitment costs) and STR revenues for this day were an estimated $149,000. An ISO may estimate an approximately 6.8 million dollars/year production cost benefit by adding the STR product.

An ISO may also study the effect of adding STR to the Day Ahead (DA) market on this day. Adding STR requirements to the DA market increases production cost by approximately $69,000. Based on this study, the ISO may estimate that adding STR to the DA market increases annual production costs by approximately $1.8 million.

Considering RT and DA production costs, the ISO may estimate net benefit of STR product to be approximately 5 million dollars/year. Note that these benefit estimates may be based on actual production studies and historical market data, specifically historical RDT binding information, and may change significantly in either direction if RDT utilization changes.

From a market efficiency point of view, the total RSG reduction for the South Region may be estimated to be approximately $1.6 million. The estimate of reduced RSG was calculated by identifying the resources that received RSG and reducing the RSG by the STR revenue received by those resources.

Note that following RSG reduction may be highly dependent on the local penalty price for reserve zones 6-8. This RSG number may potentially change significantly if a significant commitment is observe to be changed in DA due to STR; however, a large DA commitment change due to STR may not be observed. Additionally, no commitment changes may be assumed in IRAC, FRAC, and LAC processes. Approximated annual RSG reduction may be exemplarily $1.1 million USD/year in reserve zone 6, $0.29 million USD/year in reserve zone 7, and $0.22 million USD/year in reserve zone 8

Techniques described herein may be implemented in digital electronic circuitry, or in computer hardware, firmware, software, or in combinations of them. The techniques may be implemented as a computer program product, i.e., a computer program tangibly embodied in an information carrier, e.g., in a machine-readable storage device, in machine-readable storage medium, in a computer-readable storage device or, in computer-readable storage medium for execution by, or to control the operation of, data processing apparatus, e.g., a programmable processor, a computer, or multiple computers. A computer program may be written in any form of programming language, including compiled or interpreted languages, and it may be deployed in any form, including as a stand-alone program or as a module, component, subroutine, or other unit suitable for use in a computing environment. A computer program may be deployed to be executed on one computer or on multiple computers at one site or distributed across multiple sites and interconnected by a communication network.

Method steps of the techniques may be performed by one or more programmable processors executing a computer program to perform functions of the techniques by operating on input data and generating output. Method steps may also be performed by, and apparatus of the techniques may be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor may receive instructions and data from a read-only memory or a random access memory or both. The essential elements of a computer are a processor for executing instructions and one or more memory devices for storing instructions and data. Generally, a computer may also include, or be operatively coupled to receive data from or transfer data to, or both, one or more mass storage devices for storing data, such as, magnetic, magneto-optical disks, or optical disks. Information carriers suitable for embodying computer program instructions and data include all forms of non-volatile memory, including by way of example semiconductor memory devices, such as, EPROM, EEPROM, and flash memory devices; magnetic disks, such as, internal hard disks or removable disks; magneto-optical disks; and CD-ROM and DVD-ROM disks. The processor and the memory may be supplemented by, or incorporated in special purpose logic circuitry.

Several embodiments of the invention are specifically illustrated and/or described herein. However, it will be appreciated that modifications and variations are contemplated and within the purview of the appended claims.

What is claimed is:

1. A computer-implemented method for operating an electrical power grid, the electrical power grid including a plurality of power generation participants providing electrical power to the electrical power grid, a plurality of consumers drawing electrical power from the electrical power grid, and a controller that administers the market for the power generation participants and the consumers on the electrical power grid, the method including:
   providing a short-term reserve (STR) product for the consumers, by the power generation participants by deploying online STR resources as energy and by deploying offline STR resources through commitment or startup instructions, and
   sharing, by the controller, a ramp capability product (RCP) with the STR product for an amount of overlapping time such that an aggregate power supplied breaches a resource maximum,
   wherein the RCP is able to ramp up deployment such that capacity is converted to energy in a shorter time period than the STR product, and
   wherein the STR product provides cleared STR beyond the amount of overlapping time.

2. The method of claim 1, wherein the delivery timeframe for the STR product is 30 minutes, the amount of overlapping time being less than the 30 minutes.

3. The method of claim 1, wherein the STR product is provided by the controller:
   (i) in response to contingencies,
   (ii) to manage regional directional transfer (RDT) constraint,
   (iii) in response to local or regional capacity needs, and/or
   (iv) to manage levels of uncertainties, the levels satisfying a criterion.

4. The method of claim 1, wherein the resource maximum is further breached by a contingency reserve (CR) product that further overlaps with the RCP and STR products.

5. The method of claim 1, wherein the controller determines STR requirements dynamically.

6. The method of claim 1, wherein the controller deploys online STR resources within market cycles.

7. The method of claim 1, wherein the controller has commitment control over offline STR cleared resources.

8. The method of claim 1, further comprising:
   providing an inherent deliverability test to the power generation participants to ensure proper deliverability of cleared STR products.

9. A controller on an electrical power grid, including an electrical power grid, a plurality of power generation participants providing electrical power to the electrical power grid, a plurality of consumers drawing electrical power from the electrical power grid, and the controller that administers a market for the power generation participants and the consumers on the electrical power grid, wherein the controller is configured to perform the method as set forth in claim 1.

10. A system for operating an electrical power grid, a plurality of power generation participants providing electrical power to the electrical power grid, a plurality of consumers drawing electrical power from the electrical power grid, and a controller that administers a market for the power generation participants and the consumers on the electrical power grid, the system comprising:
    one or more processors; and
    a computer readable medium having executable instructions stored thereon such that the one or more processors, in response to execution of the instructions, are operative to provide, an STR product for the consumers,
    wherein the STR product is provided by the power generation participants through by deploying online resources as energy and by deploying offline resources through commitment or startup instructions, and
    wherein the controller shares an RCP with the STR product for an amount of overlapping time such that an aggregate power supplied breaches a resource maximum,
    wherein the RCP is able to ramp up deployment such that capacity is converted to energy in a shorter time period than the STR product, and
    wherein the STR product provides cleared STR beyond the amount of overlapping time.

11. The system of claim 10, wherein the delivery timeframe for the STR product is 30 minutes, the amount of overlapping time being less than the 30 minutes.

12. The system of claim 10, wherein the STR product is provided by the controller:
    (i) in response to contingencies,
    (ii) to manage RDT constraint,
    (iii) in response to local or regional capacity needs, and/or
    (iv) to manage levels of uncertainties, the levels satisfying a criterion.

13. The system of claim 10, wherein the resource maximum is further breached by a contingency reserve (CR) product that further overlaps with the RCP and STR products.

14. The system of claim 10, wherein the controller determines STR requirements dynamically.

15. The system of claim 10, wherein the controller deploys online STR resources within market cycles.

16. The system of claim 10, wherein the controller has commitment control over offline STR cleared resources.

17. The system of claim 10, wherein the one or more processors are further operative to provide an inherent deliverability test to the power generation participants to ensure proper deliverability of cleared STR products.

* * * * *